(12) United States Patent
Hacker

(10) Patent No.: US 7,256,236 B1
(45) Date of Patent: Aug. 14, 2007

(54) MALEATED POLYPROPYLENES AND PROCESSES FOR THE PREPARATION THEREOF

(75) Inventor: Scott M. Hacker, River Edge, NJ (US)

(73) Assignee: Honeywell International Inc., Morristown, NJ (US)

( * ) Notice: Subject to any disclaimer, the term of this patent is extended or adjusted under 35 U.S.C. 154(b) by 116 days.

(21) Appl. No.: 10/140,429

(22) Filed: May 6, 2002

Related U.S. Application Data

(60) Provisional application No. 60/289,269, filed on May 6, 2001.

(51) Int. Cl.
*C08F 267/04* (2006.01)
*C08F 255/02* (2006.01)

(52) U.S. Cl. .......... 525/54; 525/69; 525/184; 525/191; 525/193; 525/285; 525/322; 525/333.7

(58) Field of Classification Search .......... 525/64, 525/69, 184, 191, 193, 285, 322, 333.7, 333, 525/54
See application file for complete search history.

(56) References Cited

U.S. PATENT DOCUMENTS

| | | | | |
|---|---|---|---|---|
| 5,290,954 A | * | 3/1994 | Roberts et al. | 549/233 |
| 5,360,862 A | * | 11/1994 | Roberts et al. | 524/560 |
| 5,461,113 A | * | 10/1995 | Marczinke et al. | 525/193 |
| 6,046,279 A | * | 4/2000 | Roberts et al. | 525/285 |
| 6,362,280 B1 | * | 3/2002 | Lences et al. | 525/221 |

FOREIGN PATENT DOCUMENTS

WO  WO96/06120  2/1996

\* cited by examiner

*Primary Examiner*—James J. Seidleck
*Assistant Examiner*—Olga Asinovsky
(74) *Attorney, Agent, or Firm*—Colleen Szuch, Esquire

(57) ABSTRACT

Disclosed are methods for advantageously producing maleated polypropylenes having a relatively high percentage of bound maleic anhydride, based on the total amount of maleic anhydride moieties present in the grafting reaction product, and the maleated polypropylenes produced therefrom. The methods produce maleated polypropylenes wherein at least about 60% of the maleic anhydride moieties in the grafting reaction product are bound to the polypropylene.

28 Claims, 2 Drawing Sheets

US 7,256,236 B1

MALEATED POLYPROPYLENES AND PROCESSES FOR THE PREPARATION THEREOF

CROSS REFERENCE TO RELATED APPLICATIONS

The present application is related to and claims the priority benefit of United States Provisional Patent Application No. 60/289,269, filed May 6, 2001, which is assigned to the assignee of the present invention and which is incorporated herein by reference. This application is related to U.S. patent application Ser. No. 09/067,355, filed Apr. 27, 1998, now U.S. Pat. No. 6,362,280, each which is assigned to the assignee of the present Invention and which is incorporated herein by reference.

FIELD OF INVENTION

The present invention relates to functionalized polyolefin wax, to maleated polypropylenes, and to methods for producing such waxes and maleated polypropylenes. More specifically, the invention relates to methods for producing maleated polypropylenes having a relatively high percentage of bound maleic anhydride moieties, to the maleated polypropylenes obtained from such methods, and to emulsible polyolefin wax from which high clarity emulsions can be prepared.

BACKGROUND

Polyolefin waxes, including maleated polyolefins, and in particular maleated polypropylenes, are known in the art and find use in a wide range of applications. For example, emulsible polyolefin waxes are well known and are commonly used in glossy, protective substrates such as floor polish and the like. Maleated polypropylenes are useful for compatibilizing polymers, particularly polyolefins with various polar substrates, including polar polymers, mineral fillers, and the like. Such copolymers are also known for use in metal bonding adhesive compositions.

Unfortunately, many products made with conventional polyolefin wax, including emulsions of conventional polyolefin waxes, tend to be low in clarity and high in color. This is due, in part, to the general lack of colorless polyolefin wax. The problem is compounded by the process of functionalizing, such as the maleation of polypropylene, which tends to color and reduce clarity of the polyolefin wax.

Many classes of techniques are know for grafting maleic anhydride to a polymer backbone. For example, solid state maleation is carried out below the melting point of the polymer and the reaction takes place on the exposed surface of the polymer. In solvent based grafting, the substrate polymer is dissolved in an appropriate solvent and the grafting reaction takes place in solution. In melt grafting, maleic anhydride is grafted onto a polypropylene backbone by introducing maleic anhydride, or a precursor thereof, into a melt of polypropylene polymer, typically in the presence of a catalyst.

Applicants have found that the conditions which have heretofore typically been used for grafting maleic anhydride onto a polymer backbone, and particularly the conditions which typically occur in melt grafting, tend to result in an undesirably small percentage of the maleic anhydride being bound to the polymer backbone. More particularly, applicants have discovered that prior art methods, as disclosed for example in U.S. Pat. Nos. 3,642,722—Knowles et al and 4,506,056—Gaylord, each of which is incorporated herein by reference, result in maleated polypropylene products wherein less than about 50% of the maleic anhydride in the product of the grafting reaction is bound to the polypropylene backbone. Applicants believe that the remainder of the maleic anhydride present in the prior art grafting reaction product is unreacted and/or oligomeric maleic anhydride, as indicated by the article/work of Scott M. Hacker, one of the co-inventors hereof, entitled "Not All Maleated Polyolefins Are Created Equal" which is attached as an addendum hereto.

Applicants have recognized not only the above-noted drawbacks of the prior art, but that these drawbacks result in a product with poor performance properties in ceratin applications. More particularly, applicants have noted that one important use for maleated polypropylene is as a compatibilizing agent, particularly for polar substrates, fibers and filler. Applicants appreciate that as the level of bound maleic anhydride increases, the compatibilizing properties of the product increase. While bound maleic anhydride contributes to the desirable properties of maleated polypropylenes, unreacted and oligomeric maleic anhydrides present in the product tend to inhibit such properties. In fact, unbound maleic anhydride compounds remaining in maleated polypropylene products tend to act as scavengers and inhibit the compatibilization properties of the maleated polypropylene.

SUMMARY OF THE INVENTION

Figure 1:
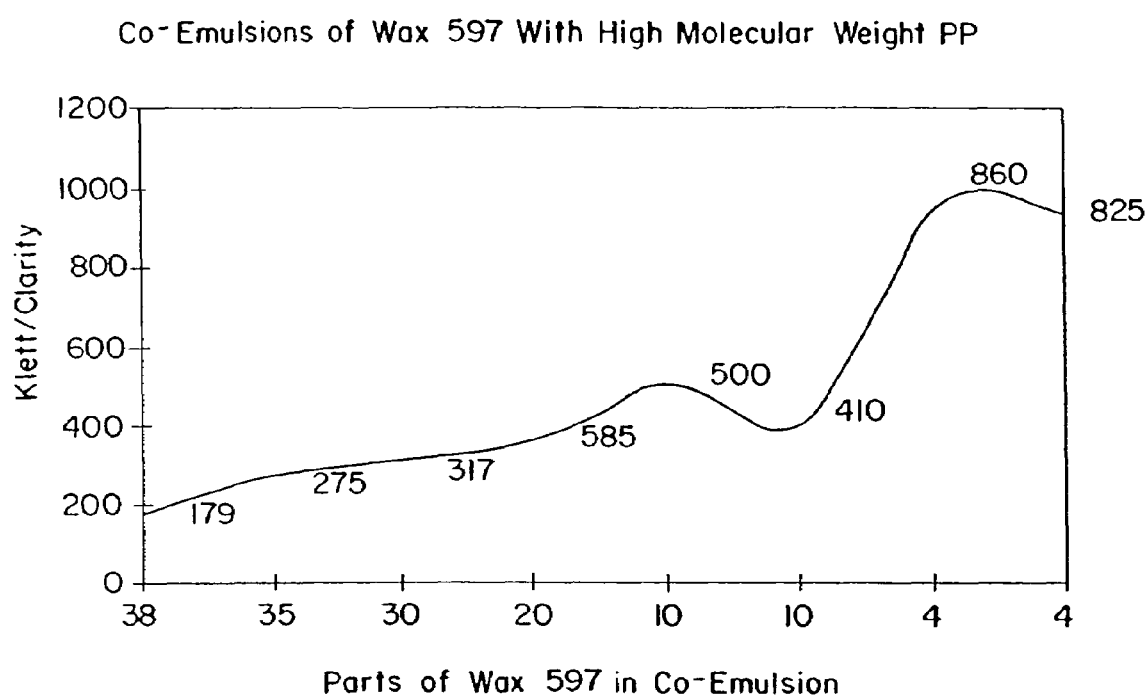
FIG. 1 shows a plot of clarity/Klett number of an emulsion made from the emulsible polyolefin of the present invention mixed with a non-emulsible polypropylene as a function of the polypropylene's molecular weight.
Figure 2:
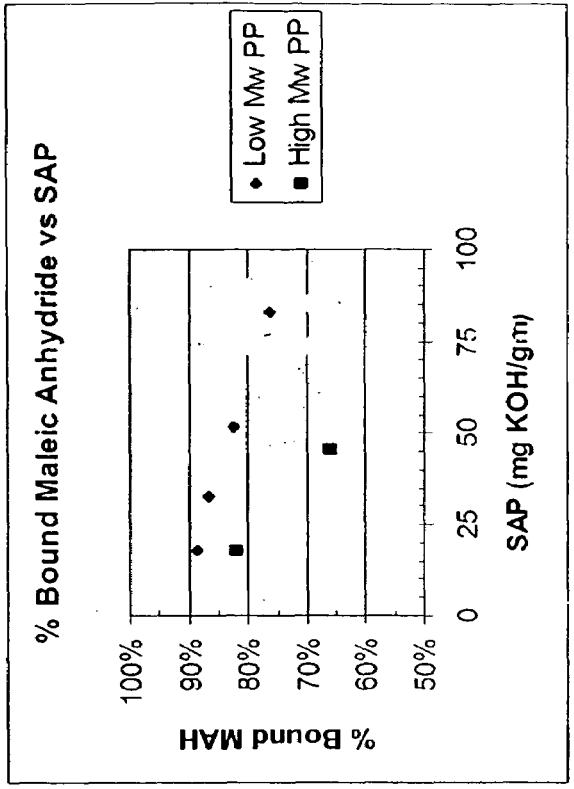
FIG. 2 shows a plot of SAP versus bound maleic anhydride for high and low molecular weight polypropylene.

The present invention is directed to methods for advantageously producing maleated polypropylenes having a relatively high percentage of bound maleic anhydride, based on the total amount of maleic anhydride moieties present in the grafting reaction product, and the maleated polypropylenes produced therefrom. The methods of the present invention overcome the disadvantages of the prior art by facilitating the production of maleated polypropylenes wherein at least about 60%, and preferably at least about 75% of the maleic anhydride moieties in the grafting reaction product are bound to the polypropylene. Unless indicated otherwise herein, all percentages are intended to refer to weight percent.

The improved process is characterized judiciously selecting the type and nature of the reactants used and adding maleic anhydride to the selected polypropylene, and preferably polypropylene melt, under time, temperature and pressure conditions effective to graft at least about 55%, and even more preferably at least about 60%, of maleic anhydride to the polymer backbone, said percentage being based on the total maleic anhydride moieties, including precursors thereto, present in the grafting reaction product.

As used herein, the term "grafting reaction product" refers to maleated polypropylene, together with any unreacted components, by products and impurities, after the grafting reaction is deemed to be substantially completed, but before any subsequent purification steps. As used herein, the term "polypropylene" refers to and includes homopolymers of polypropylene and all forms of polypropylene copolymers, and in particular polypropylene-polyethylene copolymers, provided that at least about the majority of the polymer is formed of polypropylene moities on a mole percent basis. As used herein, the term copolymer refers to and includes terpolymers and the like. Preferably, the polyolefin reactant of the present invention is polypropylene homopolymer, or a copolymer of propylene and ethylene wherein the concentration by weight of ethylene is less than about 10%, and more preferably less than about 5%. As used herein, the term "maleated polypropylene" refers generally to the reaction product formed by grafting maleic anhydride, preferably by covalent bonding, to the polymer backbone of polypropylene. As is known in the art, therefore, such grafting reaction products in commercial applications generally comprise not only maleated polypropylene but also as unbound maleic anhydride and oligomeric maleic anhydride. The term "bound maleic anhydride" as used herein, refers generally to the moieties derived from maleic anhydride which are grafted to the polypropylene backbone according to the present invention. "Unbound maleic anhydride" refers generally to unreacted maleic anhydride or oligomeric anhydride present in the grafting reaction product. In embodiments in which the reaction takes place in the melt, the grafting reaction product is generally the melt at the conclusion of the grafting reaction step.

In certain preferred embodiments, the maleic anhydride is introduced to the polypropylene, and preferably a polypropylene melt, at a rate that maintains the concentration of maleic anhydride in the reaction mixture (e.g., in the melt) at no greater than about 120%, and even more preferably no greater than 100%, of the solubility limit of the maleic anhydride in the polypropylene at the reaction conditions.

Applicants have unexpectedly and counter intuitively discovered that grafting maleic anhydride to polypropylene in a reaction mixture wherein the amount of unreacted maleic anhydride in the mixture is maintained at a relatively low level is capable of producing a reaction product copolymer that either contains a very high level of bound maleic anhydride and/or contains a relatively low level of oligomeric maleic anhydride. In certain preferred embodiments, the polyolefin wax, for example maleated polypropylene of the present invention, has a Gardner color index of no greater than about 9, more preferably no greater than about 8, and even more preferably no greater than about 7.

For embodiments in which the reactant comprises polypropylene-polyethylene copolymer, applicants have also unexpectedly discovered that the amount of maleic anhydride which is bound in the grafting reaction is generally related to the amount of polyethylene in the copolymer. More particularly, it is generally preferred that the copolymer comprise up to about 10 mole % polyethylene, more preferably up to about 5 mole % of polyethylene, and even more preferably from about 0.5 mole % to about 3 mole % polyethylene. Applicants have discovered that polyethylene levels as described herein help to produce the claimed high levels of bound maleic anhydride without negatively effecting the compatibalization properties of the reaction product.

The present invention therefore provides an improved graft maleic anhydride/polypropylene copolymer product comprising polypropylene backbone, bound maleic anhydride and from about 0% to about 40% of unbound maleic anhydride wherein at least about 60 wt % of said maleic anhydride moieties, more preferably at least about 65 wt % of said maleic anhydride moieties, and even more preferably at least about 70% of said moieties are bound maleic anhydride, based on the total maleic anhydride moieties in the reaction product. In especially preferred embodiments, at least about 75% of said moieties are bound maleic anhydride, based on the total maleic anhydride moieties in the reaction product.

DESCRIPTION OF PREFERRED EMBODIMENTS

One aspect of the present invention is directed to methods for producing maleated polypropylenes comprising reacting maleic anhydride, or a precursor thereof, with polypropylene in a reaction mixture. It is contemplated that various particular process and unit parameters can be adapted for use with the present reaction step, and a wide range of known methods and steps for combining and reacting maleic anhydride and polypropylene in a reaction mixture can be used according to the present invention. For example, it is contemplated that processes of the present invention may comprise one or more of the classes of reaction procedures known in the art, including: melt grafting, solid state grafting, solution grafting, and the like. However, present invention is preferably conducted by melt grafting.

The steps of the present invention may be conducted on a continuous basis, on a batch basis, or on a combination of both. Those of skill in the art will, in view of the teachings contained herein, be able to adopt the present invention to any of these modes of operation without undue experimentation.

The amount of maleic anhydride which is bound in the reaction step of the present invention can be affected by numerous reaction parameters, including the nature of the polypropylene as described above, and applicants believe that it is highly advantageous to control one or more of the relevant parameters in accordance with teachings of the present invention in order to achieve a high level of bound maleic anhydride and/or low levels of unreacted and oligomeric maleic anhydride. In general, the grafting reaction step of the present invention can be conducted under any combination of particular grafting reaction conditions, provided that the reaction of polypropylene with maleic anhydride is favored relative the reaction of maleic anhydride with itself or with other components in the reaction mixture, such as maleic anhydride oligomers.

One preferred mechanism for obtaining a reaction mixture in which the polypropylene/maleic anhydride grafting reaction is highly favored is to maintain the concentration of unreacted maleic anhydride in the reaction mixture at relatively low levels compared to those levels used in prior art processes. Although applicants do not wish to be bound by or to any theory of operation, it is believed that the unexpectedly higher percentages of bound maleic anhydride and/or the low levels of oligomeric maleic anhydridefound in the preferred products of the present method are achieved, at least in part, because maleic anhydride has a limited solubility in polypropylene, an in particular in a polypropylene polymer melt. Thus, use of a low concentration of maleic anhydride results in less phase separation in the reaction mixture between the maleic anhydride, or the precursors thereof and polypropylene. Thus, the use of maleic anhydride concentrations that are not substantially greater than the solubility limit of the polymer has two distinct beneficial results. First it results in a very high percentage of the maleic anhydride being in the same phase as and in intimate contact with the polymer molecules, which is favorable for the anhydride/polymer reaction. Second, the present invention minimizes the amount of unreacted maleic anhydride exposed to conditions which favor anhydride/anhydride reaction, as would occur with the maleic anhydride that exists in a phase separate from the polymer phase. Lower phase separation therefore allows for binding of a higher percentage of the maleic anhydride introduced to the polymer melt. Furthermore, the initially formed, lightly maleated product is believed to help solubilize any additional maleic anhydride reactant that is subsequently introduced to the polymer melt in preferred embodiments of the present invention.

According to certain preferred embodiments, especially those which involve the production of graft polypropylene copolymers having viscosity of from about 200 cps at 190C to about 2000 cps at 190C, the methods of the present invention comprise reacting maleic anhydride with polypropylene under conditions effective to maintain the concentration of unreacted maleic anhydride in the reaction mixture at less than about 2.5%, more preferably less than about 2%, and even more preferably less than about 1%, during a substantial portion, and preferably during at least about 75%, of the grafting step. In ceratin embodiments, this grafting reaction step comprises adding maleic anhydride to a reaction mixture comprising polypropylene, and preferably a polypropylene melt, under conditions effective to maintain the concentration of maleic anhydride in the reaction mixture at less than about 2.5, more preferably less than about 2%, and even more preferably less than about 1% weight percent during a substantial portion, and preferably during at least about 75% of the adding step.

As used herein, the term "substantial portion" with respect to the reaction step and adding step refers to any portion or portions of the grafting reaction in which, in the aggregate, at least 50% of the maleic anhydride-polypropylene bonds are formed.

For particular embodiments in which the reaction is batch reaction, it is preferred that the maleic anhydride is added to the reaction mixture at rate of less than about 0.045 pounds of maleic anhydride or precursor thereof ("MA") per pound of polypropylene ("PP") per hour of grafting reaction conditions (MA/PP/hr), and even more preferably less than about 0.040 MA/PP/hr.

In addition, applicants have discovered that the molecular weight of the polypropylene used in the maleation process, as well as the maleic anhydride content of the maleated polypropylene, typically characterized by the saponification number of the final product, affect the percent of bound maleic anhydride found in the final product. As used herein, the term saponification number ("SAP") refers to the measure of the amount of saponifiable matter present, including bound single unit maleic anhydride, bound oligomeric maleic anhydride, unreacted maleic anhydride, unbound oligomeric maleic anhydride, and other hydrolyzable moieties, in the maleated polypropylene. The SAP is generally calculated as the number of milligrams of potassium hydroxide required to hydrolyze one gram of sample (mg KOH/g). FIG. 1 is a graphic depiction of the percent bound maleic anhydride plotted against the SAP of a low molecular weight polypropylene and a high molecular weight polypropylene. As illustrated in FIG. 1, generally, the percent bound maleic anhydride decreases as the SAP increases. In addition, as the molecular weight of the polypropylene increases, the percent bound decreases. It is believed such variables are controlled in accordance with the present invention to produce useful maleated polypropylenes having high a percent of bound maleic anhydride. More particularly, it is preferred to select the molecular weight of the polypropylene reactant and the SAP of the reactant to achieve bound maleic anhydride in accordance with the present invention. For embodiments which utilize high molecular weight polypropylene, as that term is known and used by those skilled in the art, it is preferred that the high molecular weight polypropylene has a SAP of no greater than about 70, more preferably no greater than about 75 and even more preferably no greater than 80. For embodiments which utilize low molecular weight polypropylene, as that term is known and used by those skilled in the art, it preferred that the polypropylene has a SAP of no greater than about 100, more preferably no greater than about 120 and even more preferably no greater than 150.

Sapanofication number is also a measure of a compound's ability to be emulsified. In general, the higher the number, the more readily the compound is emulsified. In a preferred embodiment, the emulsible polyolefin wax has a saponification number from about 1 to about 500 mg KOH/g, more preferably, from about 20 to about 150 KOH/g, and even more preferably from about 40 to about 85 KOH/g. The emulsible polyolefin wax of the present invention should have a melt point/peak (Tm) such that it is a solid at room temperature but melts at a temperature which is convenient for processing. In a preferred embodiment, the wax has a Tm of about 50 to about 200° C., more preferably, from about 100 to about 150° C., and even more preferably from about 130 to about 145° C.

The viscosity and Mw of the present invention can vary depending upon the desired properties as required by the application. As used herein, Mw is based on gel permeation chromatography (GPC) unless otherwise indicated. It has been found that satisfactory results have been obtained in a variety of application using an emulsible polyolefin wax having a Mw of no greater than about 50,000 and a viscosity of no greater than about 2,500 cps at 190° C. Preferably, the wax has a Mw of no greater than about 25,000 and a viscosity of no greater than about 1,000 cps at 190° C. More preferably, the wax has a Mw of about 10,000 to about 20,000 and a viscosity of about 200 to about 800 cps at 190° C.

A highly preferred embodiment of the emulsible polyolefin wax has the following physical properties: Mw about 14,000; Mz about 36,000; Mn about 3,100; saponification number about 75 to about 85 KOH/g; Gardner color of below 7 to about 8; viscosity about 300 to about 800 cps @ 190° C.; drop point about 142-148° C.; melt point about 133 Tm DSC ° C.; and hardness about 0.1 to about 0.3 DMM.

Suitable polyolefin wax starting materials include, for example, thermally degraded homopolymers and copolymers of ethylene, propylene, 1-butene, 4-methyl-1-pentene, 3-methyl-1-butene, 4,4-dimethyl-1-pentene, 3-methyl-1-pentene, 4-methyl-1-hexene, 5-ethyl-1-hexene, 6-methyl-1-heptene, 1-hexene, 1-heptene, 1-octene, 1-nonene, 1-decene, and the like. These homopolymeric or copolymeric crystallizable poly-alpha-olefins are prepared by conventional polymerization processes for preparing polymeric materials. Preferably, the polyolefin starting material is a polypropylene or a copolymer of propylene and ethylene wherein the concentration by weight of ethylene is less than about 10%, and more preferably less than about 2%. The starting material of the present invention is commercially available, for example, through AlliedSignal (Morristown, N.J.) under the name ACX1089.

A highly preferred starting material has the following physical properties: Mw about 7,500; Mz about 11,200; Mn about 3,000; and Gardner color of below 1.

Any commercial grade of maleic anhydride, or a precursor thereof such as maleic acid (which is converted to maleic anhydride under many commonly used grafting reaction conditions) is suitable for use in the present invention. Examples of suitable maleic anhydrides include those that are is commercially available, for example, though Monsanto Company (St. Louis, NO) as Maleic Anhydride, and Huntsman Petrochemical Corporation (Chesterfield, Mo.) as Manbri Maleic Anhydride.

Any suitable amounts of maleic anhydride and polypropylene can be used in the method of the present invention. In certain preferred embodiments, the weight ratio of polypropylene to maleic anhydride used in the present method is from about 5:1 to about 40:1. More preferably the weight ratio is from about 5:1 to about 25:1, and even more preferably is from about 10:1 to about 20:1.

In certain preferred embodiments of the present invention, the reacting step further comprises reacting the maleic anhydride with the polypropylene in the presence of a catalyst. Any of a wide range of catalysts can be used in the present invention. Suitable catalysts include, for example, free radical forming agents known in the art and include, for example, dialkyl peroxides, tertiary butyl hydroperoxide, cumene hydroperoxide, p-menthane peroxide, p-menthane hydroperoxide or axo compounds, such as azobis (isobutyronitrile), or irradiation sources. The preferred free radical sources are the peroxides with the butyl peroxides being more preferred. The most preferred peroxide, due to availability and suitable good results obtained thereby, is ditertiary butyl peroxide (di-t-butyl peroxide). These compounds are commercially available through, for example, Elf Atochem as Lupersol 101 or Di-t-Butyl Peroxide, and Akzo Nobel Chemicals Inc. as Trigonox B.

The amount of peroxide or free radical agent used is generally quite low, being of the order of about 0.01 to about 5 wt % based on the starting material, preferably about 0.1 to about 3 wt % with about 0.75 to about 1.25 wt % being most preferred. Amounts much above 5 wt % are not needed for good properties whereas amounts below about 0.01 wt % provide reactions that are too slow and incomplete.

Like the polycarboxylic compound feed, it is highly preferable that the free radical initiator be added to the reaction mass slowly. The free radical initiator is added to the reaction at a rate of preferably about 0.01 to about 3 wt % of the starting material per hour, more preferably about 0.1 to about 1 wt % of the starting material per hour, and even more preferably about 0.3 wt % of the starting material per hour.

According to certain embodiments, the catalysts are added to the reaction mixture of the present invention. The catalyst can be added simultaneously and/or separately in relation to the maleic anhydride. In preferred embodiments, the maleic anhydride and catalyst are added to the reaction mixture substantially simultaneously in a temporal sense but separately in the sense location at which they are added to the reaction mixture. In other words, it is preferred that maleic anhydride and catalyst are added to the reaction mixture in overlapping time periods but through different nozzles or inlet ports which introduce the catalysts at a place that is displaced from the location of the maleic anhydride introduction.

The process of the present invention may further comprise the use of other additives in the reaction mixture and/or in the final product. In general, any additive which does not substantially hinder the formation of a product of the present invention may be used in suitable amounts. Examples of suitable additives include: comonomers, such as, styrene, chain transfer agents, stabilizers, and the like.

The reaction of the present invention may be carried out under any suitable reaction conditions. In general, it is preferred that the polypropylene comprise a polypropylene melt. Accordingly, it is generally preferred that the temperature of reaction be above the melt temperature of the polypropylene, but preferably no greater than about 200° C. The temperature is dependent upon the particular polypropylene, free radical initiators/catalyst and other parameters that impact the grafting reaction rate. At temperatures much below about 150° C., many of the preferred starting materials will not be in the molten form and therefore will not adequately react with the maleic anhydride. However, at temperatures above about 200° C., the ease of emulsification and melt viscosity of the resulting emulsible polyolefin wax is not as high as preferred. Therefore, reaction temperature is generally preferably between about 150 and about 200° C., and preferably between about 180 and about 190° C.

The reaction pressure depends, among other things, upon the reaction temperature and desired rate of reaction. Generally, the reaction is conducted under a pressures preferably from about 0 to about 50 psig, more preferably from about 5 to about 30 psig, and even more preferably from about 10 to about 20 psig. Reactions conducted at or around atmospheric pressure avoid expensive high pressure equipment.

Generally, the grafting reaction of the present invention is conducted such that at least about 60 wt % of maleic anhydride, based on total weight of maleic anhydride in the grafting reaction product, is bound to the polymer backbone. Preferably, the reaction is conducted such that at least 70 wt % maleic anhydride is bound, and even more preferably at least 80 wt % is bound.

EXAMPLES

Comparative Example This example illustrates the production of a maleated propylene in accordance with the prior art as represented by U.S. Pat. No. 3,642,722.

High molecular weight polypropylene having an inherent viscosity of 1.5 is fed to a thermal degradation unit for an average contact time of 30 minutes. The thermal degrader is operated at a temperature of 370C with the agitator operated at a speed of such that all of the thermal energy for degradation is supplied by the friction of mixing. The degraded polypropylene wax has a melt viscosity of about 800 centipoise measured at 190C. This material is passed along with 5 percent by weight of maleic anhydride and 0.25 percent by weight of ditertiary butyl peroxide to a thermal agitated reactor maintained at about 200C to produce a reaction product mixture, and even after standard techniques for separating unreacted maleic hydride from the reaction mixture, had a concentration of bound maleic anhydride of less than about 50%.

Example 1

To a clean, dry reactor, purged with nitrogen, is charged 89 parts by weight (pbw) of polypropylene (Hiwax NP055). The polypropylene is heated to melt, agitation of the polypropylene is started, and the temperature is then adjusted to 185-187° C. The nitrogen is stopped and to the reactor is charged with 9 pbw of maleic anhydride at a rate of 0.034 lbs maleic anhydride/lbs polypropylene/hr and 2 pbw of a peroxide mixture comprising 1 pbw Lupersol and 1 pbw Parol 100 at a rate of 0.008 lbs/lbs polypropylene/hr. Introduction of the maleic anhydride and the catalyst begin substantially simultaneously but using displaced reactor inlet nozzles. After the peroxide mixture is completely added (which occurs 15 minutes after the maleic anhydride addition is completed) the reaction mixture is stirred for an additional 10 minutes. Standard techniques are used in an effort to remove unreacted maleic anhydride. More particularly, a vacuum of 25" Hg is applied to the grafting reaction product and periodic samples are removed and tested for unreacted maleic anhydride. The vacuum is removed and the reaction mixture is cooled to 170° C., and the grafting reaction product mixture after the standard vacuum purification comprises greater than 70%, and more preferably greater than about 80%, and even more preferably greater than 85% bound maleic anhydride.

The invention claimed is:

1. A composition comprising:
   (a) a graft copolymer product comprising (i) backbone comprising polypropylene or derived from polypropylene, and (ii) bound maleic anhydride moieties; said graft copolymer having an average molecular weight of not greater than about 20,000 and a viscosity of from about 200 to about 1000 cps at about 190° C.; and
   (b) unbound maleic anhydride moieties,
   wherein said unbound maleic anhydride moieties are present in a concentration less than about 50% by weight of the total bound and unbound maleic anhydride present in the compatibilizing agent;
   wherein said graft copolymer is a product of a grafting reaction; and
   wherein said unbound maleic anhydride comprises unreacted maleic anhydride and oligomers containing maleic anhydride moieties.

2. The composition of claim 1 wherein said bound maleic anhydride moieties comprise from about 70% to about 100% by weight of the total of bound and unbound maleic anhydride moieties in the compatibilizing agent.

3. The composition of claim 2 wherein said bound maleic anhydride moieties comprise from about 75% to about 100% by weight of the total bound and unbound maleic anhydride moieties in the compatibilizing agent.

4. The composition of claim 3 wherein said bound maleic anhydride moieties comprise from about 80% to about 100% by weight of the total bound and unbound maleic anhydride moieties in the compatibilizing agent.

5. The composition of claim 1 wherein said polypropylene comprises propylene-ethylene copolymer.

6. The composition of claim 5 wherein said propylene-ethylene copolymer is formed from up to about 10 mole % polyethylene.

7. The composition of claim 5 wherein said propylene-ethylene copolymer is formed from up to about 5 mole % polyethylene.

8. The composition of claim 5 wherein said propylene-ethylene copolymer is formed from about 0.5 mole % to about 3 mole % polyethylene.

9. A composition comprising:
   (a) a graft copolymer product comprising (i) polypropylene backbone derived from polypropylene, and (ii) bound maleic anhydride moieties; said graft copolymer having an average molecular weight of not greater than about 25.000 and a viscosity of from about 1000 to about 25.000 cps at about 190° C.; and
   (b) unbound maleic anhydride moieties,
   wherein said unbound maleic anhydride moieties are present in a concentration of less than about 50% by weight of the total bound and unbound maleic anhydride moieties present in the compatibilizing agent;
   wherein said graft copolymer is a product of a grafting reaction; and
   wherein said unbound maleic anhydride comprises unreacted maleic anhydride and oligomers containing maleic anhydride moieties.

10. The composition of claim 9 wherein said bound maleic anhydride moieties comprise from about 70% to about 100% by weight of the total of bound and unbound maleic anhydride moieties in the compatibilizing agent.

11. The composition of claim 10 wherein said bound maleic anhydride moieties comprise from about 75% to about 100% by weight of the total of bound and unbound maleic anhydride moieties in the compatibilizing agent.

12. The composition of claim 11 wherein said bound maleic anhydride moieties comprise from about 80% to about 100% by weight of the total of bound and unbound maleic anhydride moieties in the compatibilizing agent.

13. The composition of claim 9 wherein said polypropylene comprises propylene-ethylene copolymer.

14. The composition of claim 13 wherein said propylene-ethylene copolymer is formed from up to about 10 mole % ethylene.

15. The composition of claim 13 wherein said propylene-ethylene copolymer is formed from up to about 5 mole % ethylene.

16. The composition of claim 13 wherein said propylene-ethylene copolymer is formed from about 0.5 mole % to about 3 mole % ethylene.

17. A process for producing compositions containing maleated polypropylene, said process comprising grafting maleic anhydride to polypropylene in a melt reaction wherein said maleic anhydride is added to the melt at a rate and under conditions effective to produce a grafting reaction product having at least about 50% by weight of bound maleic anhydride based on the total weight of bound and unbound maleic anhydride moieties in the grafting reaction product; and wherein said unbound maleic anhydride comprises unreacted maleic anhydride and oligomers containing maleic anhydride moieties.

18. The process of claim 17 wherein said polypropylene comprises propylene-ethylene copolymer.

19. The process of claim 18 wherein said propylene-ethylene copolymer is formed from up to about 10 mole % ethylene.

20. The process of claim 18 wherein said propylene-ethylene copolymer is formed from up to about 5 mole % ethylene.

21. The process of claim 18 wherein said propylene-ethylene copolymer is formed from about 0.5 mole % to about 3 mole % ethylene.

22. A process for producing maleated polypropylene comprising the step of reacting maleic anhydride with polypropylene in a reaction mixture comprising a concentration of maleic anhydride maintained so as to produce a reaction product in which at least about 60% by weight of maleic anhydride moieties in the reaction product are bound maleic anhydride, based on the total weight of bound and unbound maleic anhydride moieties in the reaction product; wherein said unbound maleic anhydride comprises unreacted maleic anhydride and oligomers containing maleic anhydride moieties.

23. The process of claim 22 wherein said polypropylene comprises propylene-ethylene copolymer.

24. The process of claim 23 wherein said propylene-ethylene copolymer is formed from up to about 10 mole % polyethylene.

25. The process of claim 23 wherein said propylene-ethylene copolymer is formed from up to about 5 mole % polyethylene.

26. The process of claim 23 wherein said propylene-ethylene copolymer is formed from about 0.5 mole % to about 3 mole % polyethylene.

27. The process of claim 17 wherein said at least 75% of said grafting step comprises maintaining the concentration of unreacted maleic anhydride in the reaction mixture at less than about 2.5 weight percent.

28. The process of claim 27 wherein said grafting step comprises adding maleic anhydride to said melt under conditions effective to maintain the concentration of maleic anhydride in the melt at less than about 2.5 weight percent during at least about 75% of said adding step.

* * * * *